United States Patent [19]
Gilchrist et al.

[11] Patent Number: 6,167,517
[45] Date of Patent: Dec. 26, 2000

[54] TRUSTED BIOMETRIC CLIENT AUTHENTICATION

[75] Inventors: Gary Gilchrist, San Francisco; Steven D. Viavant, Piedmont, both of Calif.

[73] Assignee: Oracle Corporation, Redwood Shores, Calif.

[21] Appl. No.: 09/058,394

[22] Filed: Apr. 9, 1998

[51] Int. Cl.[7] ...................................................... H04L 9/08
[52] U.S. Cl. ........................................ 713/186; 713/182
[58] Field of Search .................................... 713/186, 182

[56] References Cited

U.S. PATENT DOCUMENTS

| | | | |
|---|---|---|---|
| 5,229,764 | 7/1993 | Matchett et al. | 340/825.34 |
| 5,280,527 | 1/1994 | Gullman et al. | 380/23 |
| 5,613,012 | 3/1997 | Hoffman et al. | 382/115 |
| 5,648,648 | 7/1997 | Chou et al. | 235/382 |
| 5,784,566 | 7/1998 | Viavant et al. | 395/200.59 |
| 5,887,131 | 3/1999 | Angelo | 395/188.01 |

FOREIGN PATENT DOCUMENTS

| | | | |
|---|---|---|---|
| WO 97/08868 | 3/1997 | European Pat. Off. | H04L 9/08 |
| WO 9708868 | 3/1997 | WIPO | 340/34 |

OTHER PUBLICATIONS

Michael Kuperstein, Face Reccognization, Definse & Security Electronics v28, n3, p28(2), Mar. 1996.
Bruce Schneier, Applied Cryptography 2e, John Wiley, pp. 30, 353–354,433–441, Oct. 1996.

*Primary Examiner*—Gail O. Hayes
*Assistant Examiner*—James Seal
*Attorney, Agent, or Firm*—Park & Vaughn LLP

[57] ABSTRACT

One embodiment of the present invention provides a method for authenticating an identity of a user in order to secure access to a host system. In this embodiment, the host system receives an identifier for the user from a client system. This identifier is used to retrieve a template containing biometric data associated with the user, and this template is returned to the client. The client then gathers a biometric sample from the user, and compares this biometric sample with the template to produce a comparison result. Next, the client computes a message digest using the template, the comparison result and an encryption key, and sends the message digest to the host system. This computation takes places within a secure hardware module within the client computing system that contains a secure encryption key in order to guard against malicious users on the client system. Next, the host system receives the message digest and authenticates the user by determining whether the message digest was computed using the template, the encryption key, and a comparison result indicating a successful match between the biometric sample and the template. If so, the host has confidence that the client has successfully matched the template with the biometric sample, and the client is allowed to access a service on the host system. By requiring the secure hardware in the client system to include the template in the message digest, the host system can guard against a malicious user who substitutes another template to gain unauthorized access to the host system. In a variation on this embodiment, the host system retrieves the template from a centralized repository for templates.

45 Claims, 4 Drawing Sheets

TRUSTED BIOMETRIC CLIENT AUTHENTICATION

BACKGROUND

1. Field of the Invention

The present invention relates to authentication and security in networked computer systems. More particularly, the present invention relates to a method and an apparatus that uses biometric data, such as a fingerprint, to determine whether a user on a client computer system is authorized to access a service on a host computer system.

2. Related Art

As computer networks are increasingly used to link computer systems together, applications have been developed to allow a user on a client computer system to access a service on a host computer system. For example, a user on a client system may be able to access information contained in a database on a host computer system. Unfortunately, along with this increased accessibility comes increased potential for security problems. For example, communications between a client system and a host system can be intercepted and tampered with while in transit over the computer network. This may allow third parties or malicious users on a client computer system to gain access to a service on a host computer system without proper authorization.

A number of systems have been developed to ensure that users do not gain unauthorized access to host computer systems. Some systems prompt a user for passwords or a PIN numbers, before granting the user access to the host computer system. However, passwords and PIN numbers may be forgotten or may fall into the wrong hands. Additionally, using passwords and PIN numbers for security purposes places an additional burden on institutions because passwords or PIN numbers require additional machinery and human resources to deal with customers when customers forget passwords or PIN numbers, or when customers request that passwords or PIN numbers be changed.

As an alternative to passwords or PIN numbers, biometric authentication systems have been developed to authorize accesses to host systems. Biometric authentication systems receive a biometric input, such as a fingerprint or a voice sample, from a user. This biometric input is compared against a prerecorded template containing biometric data associated with the user to determine whether to grant the user access to a service on the host system. One such system is described in U.S. Pat. No. 5,280,527, entitled BIOMETRIC TOKEN FOR AUTHORIZING ACCESS TO A HOST SYSTEM, issued on Jan. 18, 1994 to inventors Gullman, et al.

Existing biometric authentication systems suffer from a number of shortcomings. For example, the system described in the Gullman patent stores templates locally, on the client system. This may be practical for small numbers of templates, and small numbers of client systems. However, it is not practical to replicate large numbers of templates across a large number of client systems, because storage space on client systems is typically limited. Furthermore, when new templates are added to the system, or when existing templates become invalid, updating numerous client systems to reflect these changes can require an undue amount of effort. For the above reasons, it is preferable to store large numbers of biometric templates at the host system, or at some other site that can be centrally administered.

However, storing templates on a host system presents its own challenges. In order to perform a comparison, a template must be transferred to the client system for comparison with a biometric sample, or alternatively, a biometric sample must be transferred to the host system for comparison with the template. In either case, templates or biometric samples must be transferred across a possibly insecure computer network, in which case the templates or biometric samples may be subject to surveillance or tampering. One solution to this problem is to encrypt templates or samples while they are in transit between host and client systems. However, such encryption may be subject to an attack on the encryption algorithm. Furthermore, this does not prevent a malicious user from tampering with a client system to gain unauthorized access to the host system.

What is needed is a system for transferring biometric samples or templates between a client system and a host system that is immune to an attack on the encryption algorithm and allows in-transit tampering to be detected.

Additionally, what is needed is a system for authenticating an identity of a user that allows biometric templates to be stored at a host or a central site, which can be centrally administered.

SUMMARY

One embodiment of the present invention provides a method for authenticating an identity of a user in order to secure access to a host system. In this embodiment, the host system receives an identifier for the user from a client system. This identifier is used to retrieve a template containing biometric data associated with the user, and this template is returned to the client. The client then gathers a biometric sample from the user, and compares this biometric sample with the template to produce a comparison result. Next, the client computes a message digest using the template, the comparison result and an encryption key, and sends the message digest to the host system. This computation takes places within a secure hardware module within the client computing system that contains a secure encryption key in order to guard against malicious users on the client system. Next, the host system receives the message digest and authenticates the user by determining whether the message digest was computed using the template, the encryption key, and a comparison result indicating a successful match between the biometric sample and the template. If so, the host has confidence that the client has successfully matched the template with the biometric sample, and the client is allowed to access a service on the host system. By requiring the secure hardware in the client system to include the template in the message digest, the host system can guard against a malicious user who substitutes another template to gain unauthorized access to the host system. In a variation on this embodiment, the host system retrieves the template from a centralized repository for templates. In other embodiments, biometric data gathered from the user assumes a number of forms, including fingerprint data, voice data, retinal scan data and handwriting data.

In one embodiment of the present invention, the host system additionally sends a randomized number to the client, and the client uses this randomized number to compute the message digest. The use of this randomized number can prevent a simple mode of attack wherein an adversary listens to an authentication message on the network and replays the message. In another embodiment, the host system additionally sends a comparison threshold to the client. This comparison threshold specifies how closely the biometric sample taken from the user must match the template in order to allow the user to have access to the host system. In a variation on this embodiment, the client additionally uses this comparison threshold to perform the comparison and to compute the message digest. This prevents a malicious user on the client from setting the comparison threshold to an arbitrarily low value in order to gain unauthorized access to the host system.

DEFINITIONS

Biometric Data—Any data including measurements of a physical characteristic of the user. This includes, but is not limited to, fingerprint data, voice data, retinal scan data and handwriting data.

Client—a node on a computer network including computational capability and including a mechanism for communicating across the computer network.

Host—a node on a computer network including a mechanism for servicing requests from a client for computational or data storage resources; also referred to as a server.

Message Digest—a small set of data that to a high probability uniquely identifies a larger set of data. This includes, but is not limited to, the result after applying certain algorithms, such as the MD5 checksum algorithm, the secure hash algorithm (SHA), and the digital signing algorithm (DSA).

Randomized Number—Any number generated to be random or pseudo-random.

DETAILED DESCRIPTION OF THE INVENTION

Figure 1:
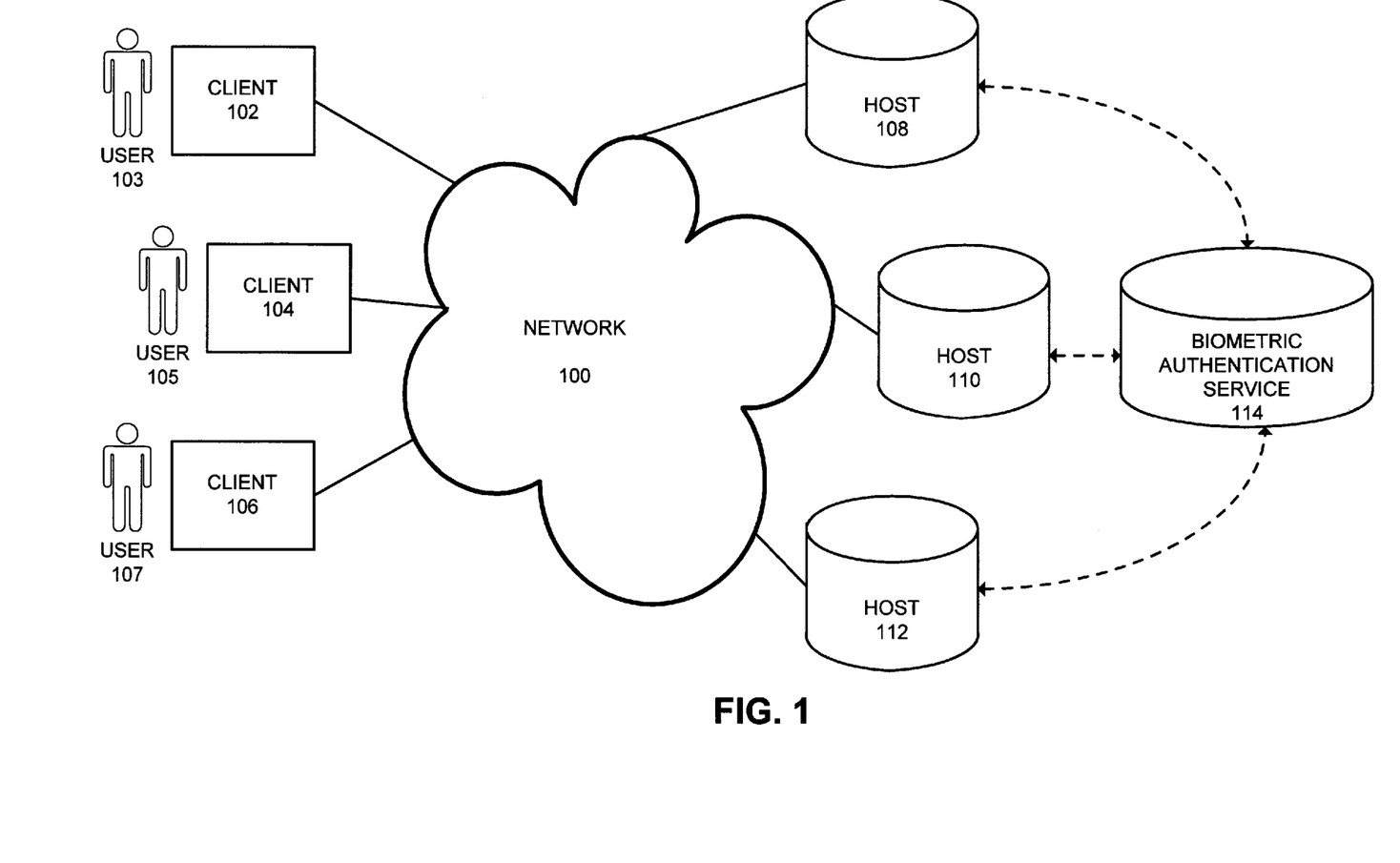
FIG. 1 is a diagram illustrating client computer systems 102, 104 and 106 coupled to host systems 108, 110 and 112 through network 100 in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.
Description of Distributed Computing System FIG. 1 is a diagram illustrating client computer systems 102, 104 and 106 coupled to host computer systems 108, 110 and 112 through network 100 in accordance with an embodiment of the present invention. Network 100 may be any communication channel through which computer systems can communicate. This includes, but is not limited to, local area networks, such as an Ethernet or Token ring, and wide area networks, such as the Internet. A client, such as client systems 102, 104 or 106, can be any node on a computer network including computational capability and including a mechanism for communicating across network 100. Client systems 102, 104 and 106 are operated by human users 103, 105 and 107, respectively. A host, such as host systems 108, 110 and 112, can be any node on a computer network including a mechanism for servicing requests from a client for computational or data storage resources. Hosts are also referred to as servers.

Host systems 108, 110 and 112 are coupled to biometric authentication service 114. Biometric authentication service 114 includes a centralized repository for storing templates of biometric data, such as fingerprint data. Biometric authentication service 114 also includes a mechanism for managing these templates, and may additionally include a mechanism to implement security policies for the templates. These policies may require specific levels of authentication for different groups of users, or for access to different servers.

Biometric authentication service 114 may be implemented in a number of forms. In one embodiment, biometric authentication service 114 is a node on network 100, which communicates with host systems 108, 110 and 112 across network 100. In another embodiment, biometric authentication service 114 is located on a host, such as host system 108.

The embodiment illustrated in FIG. 1 operates generally as follows. A user, such as user 103, works on a client, such as client system 102. User 103 requests access to resources on host system 108 across network 100. In response to this request, host system 108 attempts to authenticate user 103. In doing so, host system 108 requests a template of biometric data from biometric authentication service 114. Biometric authentication service 114 returns a template, which is compared against a sample of biometric data gathered from user 103. This comparison may take place at a number of locations, including at client system 102, at host system 108 or at biometric authentication service 114. If the sample matches the template, user 103 is granted access to resources on host system 108.

Figure 2:
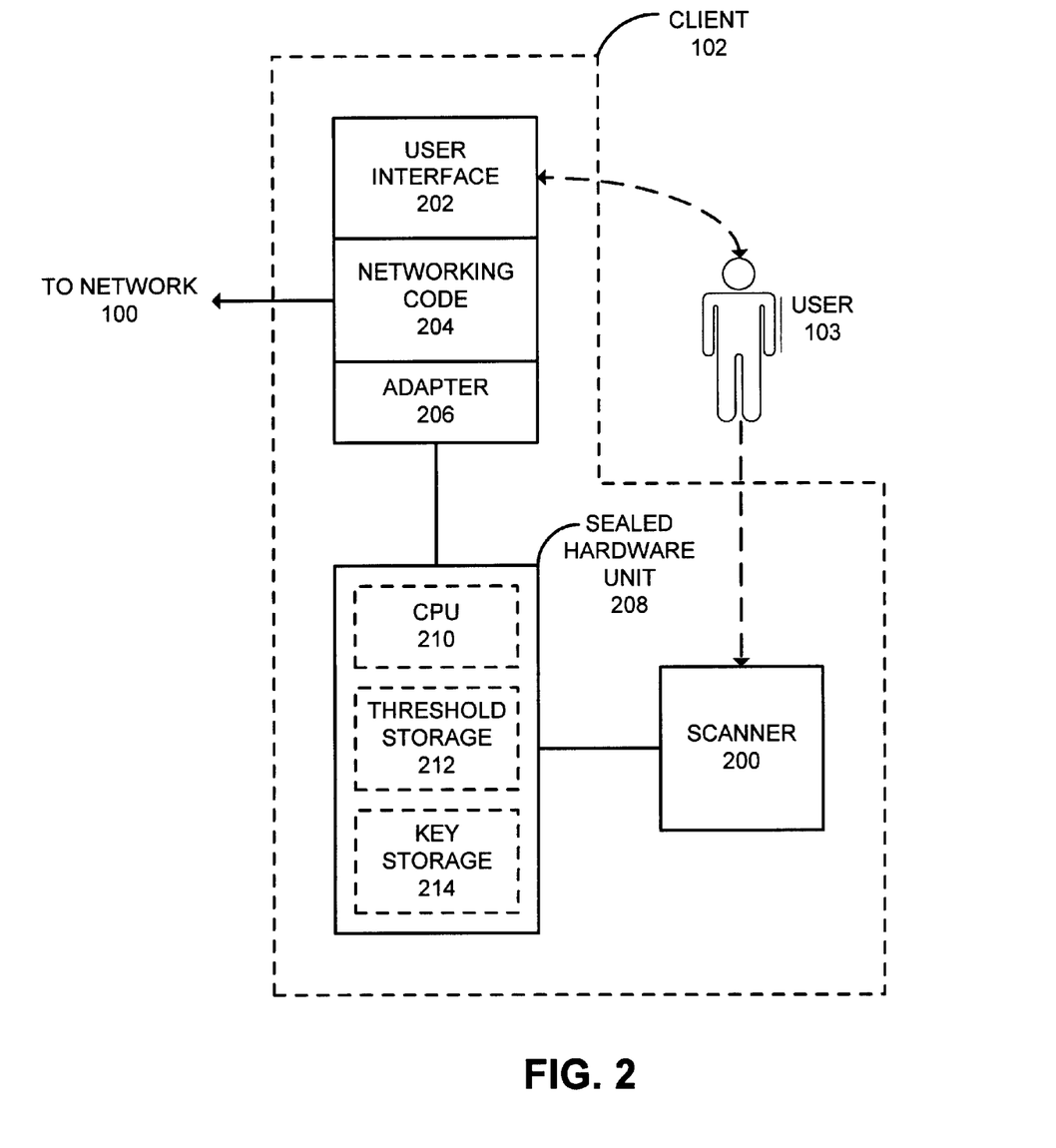
FIG. 2 is a block diagram illustrating some of the functional components within client computer system 102 in accordance with an embodiment of the present invention.

Providing a centralized authentication service, such as biometric authentication service 114 has a number of advantages. One advantage is that centralized revocation can be supported. For example, an employee in an organization typically has access to a number of different resources on a number of different host systems. When this employee leaves the organization, it often takes a long time to explicitly revoke the employee's access rights on all host systems. Under a centralized revocation scheme, such revocation only needs to takes place once, at the centralized revocation service, since the disparate host systems always look to the centralized revocation service to authenticate a user.
Description of Client System FIG. 2 is a block diagram illustrating some of the functional components within client computer system 102 in accordance with an embodiment of the present invention. As mentioned above, client system 102 can be any node on a computer network including computational capability and including a mechanism for communicating across network 100. In the illustrated embodiment, client system 102 includes user interface 202, networking code 204 and adapter 206. These functional components can be implemented in software running on a client CPU, which is not shown. User interface 202 provides a mechanism through which user 103 can operate client system 102. Networking code 204 includes a library of functions, which allow client system 102 to communicate across network 100. Adapter 206 includes a collection of functions that implement the client portion of the biometric authentication system according to one embodiment of the present invention. The operation of these functions is described in more detail below with reference to FIGS. 3 and 4.

Adapter 206 communicates with sealed hardware unit 208, which performs the biometric authentication operations involved in the illustrated embodiment of the present invention. In this embodiment, sealed hardware unit 208 is encased in a sealed insulating layer, which prevents a malicious user of client system 102 from monitoring the computational operations performed within sealed hardware unit 208. This prevents a malicious user from improperly gaining access to host system 108, even if the malicious user has the power to modify hardware and software resources on client system 102. In one embodiment, the circuitry inside sealed hardware unit 208 is encased in the insulating layer in such a way that any attempt to cut through the insulating layer to monitor the circuitry is likely to render the circuitry inoperable.

Sealed hardware unit 208 includes CPU 210, which can be any type of computational engine that can be used to perform the computational operations involved in biometric authentication according to one embodiment of the present invention. Sealed hardware unit 208 additionally includes threshold storage 212 and key storage 214. Threshold storage 212 stores threshold values indicating how closely a biometric sample taken from a user must match a template in order to allow the user to access the host system. Key storage 214 stores at least one encryption key that can be used to encrypt messages or compute checksums for communications across network 100.

Sealed hardware unit 208 communicates with scanner 200, which is used to take a biometric sample from user 103. This biometric sample can be any type of biometric measurement of user 103. This includes, but is not limited to, fingerprint data, retinal scan data, handwriting data and voice data.

The components illustrated in FIG. 2 operate as follows. User 103 initiates the authentication process by seeking access to resources on a host system, such as host system 108 from FIG. 1, through user interface 202. This causes authentication code within adapter 206 to initiate communications with host system 108 using networking code 204. This authentication code within adapter 206 additionally initiates operations within sealed hardware unit 208 to gather a biometric sample from user 103 through scanner 200. These authentication operations are described in more detail below with reference to the flow charts in FIGS. 3 and 4.

Description of Authentication Method That Performs Comparisons on Client

Figure 3:
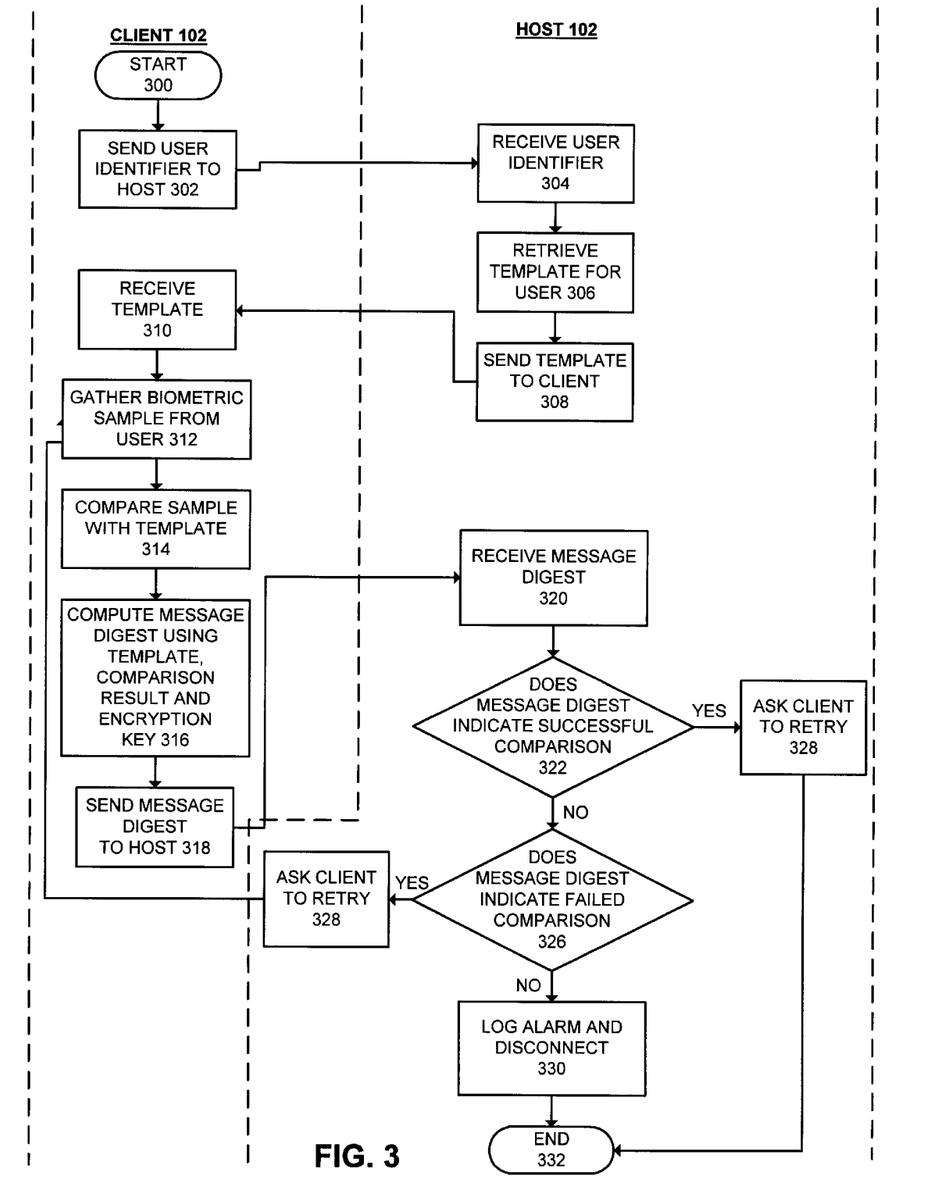
FIG. 3 is a flow chart illustrating some the operations involved in authenticating a user in accordance with an embodiment of the present invention.

FIG. 3 is a flow chart illustrating some of the operations involved in authenticating a user in accordance with one embodiment of the present invention. This flow chart is divided into right-hand and left-hand columns. Operations of client 102 are illustrated in the left-hand column, and operations of host 108 are illustrated in the right-hand column.

The system starts as state 300 and proceeds to state 302. In state 302, client 102 initiates an authentication of user 103 for a service on host 108. In doing so, client 102 sends an identifier for user 103 to host 108. The system next proceeds to state 304. In state 304, host 108 receives the identifier. The system next proceeds to state 306. In state 306, host 108 uses the identifier to retrieve a template containing biometric data associated with user 103. In one embodiment, this template is retrieved from a centralized biometric authentication service, such as biometric authentication service 114 in FIG. 1. This centralized biometric authentication service generally resides on another node on network 100. In another embodiment, this template is retrieved from a database stored locally on host 108 itself.

The system next proceeds to state 308, in which the template is sent to client 102. The system next proceeds to state 3 10. In state 310, client 102 receives the template. The system next proceeds to state 312. In state 312, client 102 gathers a biometric sample from user 103. This is accomplished using scanner 200 from FIG. 2. The system next proceeds to state 314. In state 314, client 102 compares this biometric sample to the template. In one embodiment, the comparison is performed using a comparison threshold, which indicates how closely the biometric sample taken from the user must match the template in order to allow the user to access the host. In a variation on this embodiment, the comparison threshold is supplied by biometric authentication service 114 (from FIG. 1) via host 108. In this variation, biometric authentication service 114 controls how closely the template must match the biometric sample in order to authorize certain classes of users or for certain classes of services. The system next proceeds to state 316.

In state 316, client 102 computes a message digest using the template, the result of the above comparison and an encryption key. This message digest can be computed using any non-invertable checksum or signature algorithm. These include the MD5 checksum algorithm, the secure hash algorithm (SHA) and the digital signing algorithm (DSA). The system next proceeds to state 318, in which client 102 sends the message digest to host 108.

In state 320, host 108 receives the message digest. The system next proceeds to state 322. In state 322, host 108 determines if the message digest indicates a successful comparison. Host 108 does this by computing a speculative message digest using the same template, the encryption key and a comparison result indicating a successful match between the biometric sample and the template. If this speculative message digest matches the message digest received from client 102, host 108 knows that client 102 successfully matched the template. If this is the case, the system proceeds to state 324. In state 324, the host 108 grants access to user 103. The system then proceeds to state 332, which is an end state.

If the speculative message digest does not match the message digest received from client 102, the system proceeds to state 326. In state 326, host 108 determines if the message digest indicates an unsuccessful comparison. Host 108 does this by computing a speculative message digest using the same template, the encryption key and a comparison result indicating an unsuccessful match between the biometric sample and the template. If this speculative message digest matches the message digest received from client 102, host 108 knows client 102 was not successful in matching the template, but that the message digest was computed with the proper inputs and was not tampered with. If this is the case, the system proceeds to state 328. In state 328, the host 108 asks client 102 to retry the comparison with a new biometric sample. The system then returns to state 312, to repeat the process with a new biometric sample.

If this speculative message digest does not match the message digest received from client 102, this indicates that the message digest may have been tampered with by a malicious user or an adversary. In this case, the system proceeds to state 330, in which host 108 logs an alarm and the session with user 103 is disconnected. The system next proceeds to state 332, which is an end state.

As mentioned above, by requiring the sealed hardware unit 208 within client 102 to include the template in the message digest, host 108 can guard against a malicious user who substitutes another template in the comparison operation in order to gain unauthorized access to host 108. In another embodiment of the present invention, host 108 additionally sends a randomized number to client 102, and client 102 uses this randomized number to compute the message digest. Host 108 also uses the randomized number in computing its message digest. The use of this randomized number can prevent a simple mode of attack wherein an adversary listens to an authentication message on network 100 and replays the message. This is because the message digest in any given authentication message will be based on a different random number than a message digest in a preceding authentication message. Consequently, a message digest from a preceding authentication message will not match a message digest from a current authentication message, and replaying a preceding authentication message will not fool the host system.

In another embodiment, host 108 additionally sends a comparison threshold to client 102. This comparison threshold specifies how closely the biometric sample taken from the user must match the template in order to allow user 103 to access to host 108. Client 102 uses this comparison threshold to perform the comparison and to compute the message digest. Host 108 also uses this comparison threshold to compute its corresponding message digest. This prevents a malicious user 103 on client 102 from setting the comparison threshold to an arbitrarily low value in order to gain unauthorized access to the host 108. If a substituted comparison threshold is used to perform the comparison on client 102, the message digest computed at client 102 will contain the substituted comparison threshold. Consequently, the message digest computed at client 102 will not match the message digest computed at host 108, and host 108 will know an invalid comparison has taken place. Recall that both the comparison between the biometric sample and the template and the computation of the message digest takes place inside a secure hardware module in the client system containing the encryption key. This prevents a malicious user on the client system from fooling the host system by performing the comparison using a substitute comparison threshold and computing the message digest using the comparison threshold received from the host system.

Description of Authentication Method That Performs Comparisons on Host

Figure 4:
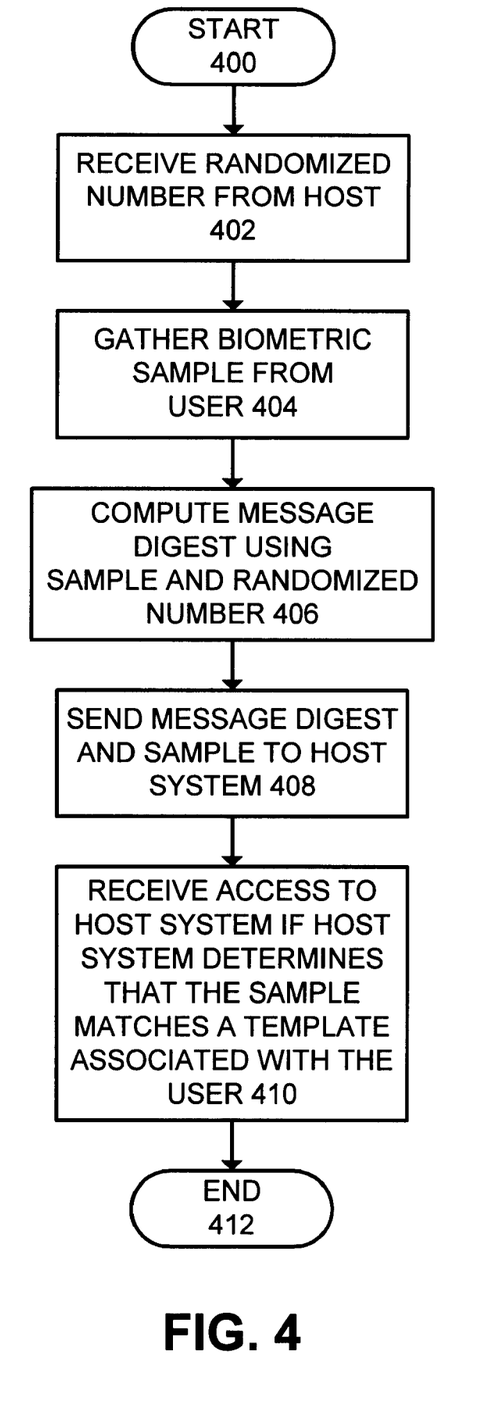
FIG. 4 is a flow chart illustrating some of the operations involved in authenticating a user in accordance with another embodiment of the present invention.

FIG. 4 is a flow chart illustrating some of the operations involved in authenticating a user in accordance with another embodiment of the present invention. In this embodiment, the comparison between the biometric sample and the template takes place at host 108, instead of on client 102. This means the biometric sample is transferred from client 102 to host 108, instead of the template being transferred from host 108 to client 102, as in the embodiment illustrated in FIG. 3.

The flow chart in FIG. 4 represents actions of client 102 during the authentication process. The system starts at state 400 and proceeds to state 402. In state 402, client 102 receives a randomized number from host 108. The system next proceeds to state 404, in which client 102 gathers a biometric sample from a user, such as user 103 in FIG. 3. The system next proceeds to state 406, in state 406, client 102 computes a message digest using the biometric sample, the randomized number and an encryption key. This message digest can be computed using any non-invertable checksum or signature algorithm. These algorithms include the MD5 checksum algorithm, the secure hash algorithm (SHA) and the digital signing algorithm (DSA). These message digest computations are performed within sealed hardware unit 208 within client 102 (see FIG. 2). The system next proceeds to state 408, in which the biometric sample and the message digest is sent to host 108. The system next proceeds to state 410.

In state 410, client 102 receives access to host 108 if host 108 determines that the biometric sample matches a template associated with the user. In examining the biometric sample, host 108 computes its own version of the message digest using the randomized number, the biometric sample and the encryption key. If this version of the message digest matches the version received from client 102, host 108 has confidence that the biometric data was sent from sealed hardware unit 208 within client 102. The use of this randomized number in computing the message digest prevents a simple mode of attack wherein an adversary listens to an authentication message on the network and replays the message. The system next proceeds to state 412, which is an end state.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art.

What is claimed is:

1. A method for authenticating an identity of a user in order to secure access to a host system, comprising:

receiving, at the host system, an identifier for the user from a client system;

retrieving, at the host system, a template containing biometric data associated with the user, the template being retrieved from a database of templates by the host system;

sending the template to the client system;

waiting for the client system to compare the template with a biometric sample gathered from the user to produce a comparison result, and to compute a first message digest using the template, the comparison result and an encryption key;

receiving, at the host system, the first message digest from the client system;

computing, at the host system, a second message digest using the template, a comparison result indicating a successful match between the biometric sample and the template, and the encryption key;

comparing, at the host system, the first message digest and the second message digest; and allowing the user to access the host system if the first message digest matches the second message digest;

wherein using the template in computing the second message digest provides an additional measure of security because the first message digest will not match the second message digest unless the client system also used the template in computing first message digest, which indicates that the client computed the comparison result using the template.

2. The method of claim 1, further comprising if the first message digest does not match the second message digest:

computing, at the host system, a third message digest using the template, a comparison result indicating an unsuccessful match between the biometric sample and the template, and the encryption key;

comparing the first message digest and the third message digest;

if the first message digest matches the third message digest, sending a message to the client system to retry the comparison with a new biometric sample; and if the first message digest does not match the third message digest, logging an alarm to indicate an intruder may be attempting to gain unauthorized access to the host system.

3. The method of claim 1, further comprising sending a randomized number from the host system to the client system; and wherein the second message digest and the first message digest are both computed using the randomized number.

4. The method of claim 1, further comprising sending a comparison threshold to the client system, the comparison threshold indicating how closely the biometric sample taken from the user must match the template in order to allow the user to access the host system.

5. The method of claim 4, wherein the first message digest and the second message digest are both computed using the comparison threshold.

6. The method of claim 1, wherein the template includes finger print data.

7. The method of claim 1, wherein the template includes retinal scan data.

8. The method of claim 1, wherein the template includes voice data.

9. The method of claim 1, wherein the template includes handwriting data.

10. The method of claim 1, wherein computing the first message digest and computing the second message digest both include computing an MD5 checksum.

11. The method of claim 1, wherein retrieving the template includes retrieving the template from a centrally managed repository for templates.

12. The method of claim 1, wherein retrieving the template includes retrieving the template from a database on the host system.

13. The method of claim 1, wherein allowing the user to access the host system includes allowing the user to access a database system.

14. The method of claim 1, wherein waiting for the client system includes waiting for secure hardware in the client system to compare the template with a biometric sample gathered from the user to produce a comparison result, and to compute a first message digest using the template, the comparison result and an encryption key.

15. A method for authenticating an identity of a user in order to secure access to a host system, comprising:

sending an identifier for the user to the host system;

receiving, from the host system, a template containing biometric data associated with the user, the template being retrieved from a database of templates by the host system;

gathering a biometric sample from the user;

comparing the template with the biometric sample to produce a comparison result;

computing a first message digest using the template, the comparison result and an encryption key;

sending the first message digest to the host system; and receiving access to the host system if the host system determines that the first message digest matches a second message digest computed at the host system using the template, a comparison result indicating a successful match between the biometric sample and the template and the encryption key;

wherein using the template in computing the second message digest provides an additional measure of security because the first message digest will not match the second message digest unless the client system also used the template in computing first message digest, which indicates that the client computed the comparison result using the template.

16. The method of claim 15, wherein comparing the template and computing the first message digest both take place inside of a secure hardware module within the client system that contains the encryption key.

17. The method of claim 15, further comprising receiving a randomized number from the host system; and wherein computing the first message digest includes using the randomized number, and computing the second message digest includes using the randomized number.

18. The method of claim 15, further comprising receiving a comparison threshold from the host system, the comparison threshold indicating how closely a biometric sample taken from a user must match the template in order to allow the user to access the host system.

19. The method of claim 18, wherein computing the first message digest includes using the comparison threshold, and computing the second message digest includes using the comparison threshold.

20. The method of claim 15, wherein the template includes fingerprint data.

21. The method of claim 15, wherein the template includes retinal scan data.

22. The method of claim 15, wherein the template includes voice data.

23. The method of claim 15, wherein the template includes handwriting data.

24. The method of claim 14, wherein computing the first message digest includes computing an MD5 checksum.

25. A method for authenticating an identity of a user in order to secure access to a host system, comprising:

receiving, at the host system, an identifier for the user from a client system;

retrieving, at the host system, a template containing biometric data associated with the user from a database of templates;

sending the template to the client system;

receiving the template at the client system;

gathering, at the client system, a biometric sample from the user;

comparing, at the client system, the template with the biometric sample to produce a comparison result;

computing, at the client system, a first message digest using the template, the comparison result and an encryption key;

sending the first message digest to the host system;

receiving, at the host system, the first message digest;

computing, at the host system, a second message digest using the template, a comparison result indicating a successful match between the biometric sample and the template, and the encryption key;

comparing, at the host system, the first message digest and the second message digest; and allowing the user to access the host system if the first message digest matches the second message digest;

wherein using the template in computing the second message digest provides an additional measure of security because the first message digest will not match the second message digest unless the client system also used the template in computing first message digest, which indicates that the client computed the comparison result using the template.

26. The method of claim 25, further comprising sending a randomized number from the host system to the client system; and wherein the second message digest and the first message digest are both computed using the randomized number.

27. The method of claim 25, further comprising sending a comparison threshold from the host system to the client system, the comparison threshold indicating how closely the biometric sample taken from the user must match the template in order to allow the user to access the host system.

28. The method of claim 27, wherein the first message digest and the second message digest are both computed using the comparison threshold.

29. The method of claim 25, wherein comparing the template and computing the first message digest at the client system both take place inside of a secure hardware module within the client system that contains the encryption key.

30. A method for authenticating an identity of a user in order to secure access to a host system, comprising:

receiving, from the host system, a randomized number;

gathering a biometric sample from the user;

computing a first message digest using the biometric sample, the randomized number and an encryption key;

sending the biometric sample and the first message digest to the host system;

receiving access to the host system if the host system determines that the biometric sample matches a template containing biometric data associated with the user, and that the first message digest matches a second message digest computed at the host system using the biometric sample, the randomized number and the encryption key;

wherein the template is retrieved from a database of templates by the host system; and wherein using the template in computing the second message digest provides an additional measure of security because the first message digest will not match the second message digest unless the client system also used the template in computing first message digest, which indicates that the client computed the comparison result using the template.

31. A program storage device storing instructions that when executed by a computer perform a method for authenticating an identity of a user in order to secure access to a host system, comprising:

receiving, at the host system, an identifier for the user from a client system;

retrieving, at the host system, a template containing biometric data associated with the user, the template being retrieved from a database of templates by the host system;

sending the template to the client system;

waiting for the client system to compare the template with a biometric sample gathered from the user to produce a comparison result, and to compute a first message digest using the template, the comparison result and an encryption key;

receiving, at the host system, the first message digest from the client system;

computing, at the host system, a second message digest using the template, a comparison result indicating a successful match between the biometric sample and the template, and the encryption key;

comparing, at the host system, the first message digest and the second message digest; and allowing the user to access the host system if the first message digest matches the second message digest;

wherein using the template in computing the second message digest provides an additional measure of security because the first message digest will not match the second message digest unless the client system also used the template in computing first message digest, which indicates that the client computed the comparison result using the template.

32. An apparatus for authenticating an identity of a user in order to secure access to a host system, comprising:

the host system;

a mechanism within the host system that receives an identifier for the user from a client system;

a mechanism within the host system that retrieves a template containing biometric data associated with the user from a database of templates;

a mechanism within the host system that sends the template to the client system;

a mechanism within the host system that receives a first message digest from the client system;

a mechanism within the host system that computes a second message digest using the template, an encryption key, and a comparison result indicating a successful match between the template and the biometric sample taken from the user;

a comparison mechanism within the host system for comparing the first message digest and the second message digest; and a mechanism within the host system that allows the user to access the host system if the first message digest matches the second message digest;

wherein using the template in computing the second message digest provides an additional measure of security because the first message digest will not match the second message digest unless the client system also used the template in computing first message digest, which indicates that the client computed the comparison result using the template.

33. The apparatus of claim 32, wherein the comparison mechanism can be used to compare the first message digest with a third message digest, and further comprising:

a mechanism within the host system that computes the third message digest using the template, the encryption key, and a comparison result indicating an unsuccessful match between the template and the biometric sample taken from the user;

a mechanism within the host system that sends a message to the client system to retry the comparison with a new biometric sample if the first message digest matches the third message digest;

a mechanism within the host system that logs an alarm to indicate an intruder may be attempting to gain unauthorized access to the host system if the first message digest does not match the third message digest.

34. The apparatus of claim 32, further comprising a mechanism within the host system that sends a randomized number to the client system; and wherein the mechanism within the host system that computes the second message digest is configured to compute the second message digest using the randomized number.

35. The apparatus of claim 32, further comprising a mechanism within the host system that sends a comparison threshold to the client system, the comparison threshold indicating how closely a biometric sample taken from a user must match the template in order to allow the user to have access to the host system.

36. The apparatus of claim 35, wherein the mechanism within the host system that computes the second message digest is configured to compute the second message digest using the comparison threshold.

37. The apparatus of claim 32, wherein the mechanism that retrieves the template is configured to retrieve the template from a centrally managed repository for user templates.

38. The apparatus of claim 32, wherein the mechanism that retrieves the template is configured to retrieve the template from a database on the host system.

39. The apparatus of claim 32, wherein the host system includes a database system.

40. An apparatus for authenticating an identity of a user in order to secure access to a host system, comprising:

a client system;

a mechanism, within the client system, that sends an identifier for the user to the host system;

a mechanism, within the client system, that receives a template containing biometric data associated with the user from the host system;

a biometric gathering device, for gathering a biometric sample from the user;

a comparison unit, within the client system, coupled to the biometric gathering device, including circuitry to compare the biometric sample with the template; and a computation unit, within the client system, for computing a first message digest using the template, a result from the comparison unit and an encryption key; and a mechanism, within the client system, that sends the first message digest to the host system;

a mechanism, within the client system, for receiving access to the host system if the host system determines that the first message digest matches a second message digest computed at the host system using the template, a comparison result indicating a successful match between the biometric sample and the template, and the encryption key, the template being retrieved from a database of templates by the host system;

wherein using the template in computing the second message digest provides an additional measure of security because the first message digest will not match the second message digest unless the client system also used the template in computing first message digest, which indicates that the client computed the comparison result using the template.

41. The apparatus of claim 40, wherein the comparison unit and the computation unit are implemented together in a single piece of circuitry.

42. The apparatus of claim 40, wherein the comparison unit and the computation unit are encased in a sealed insulating layer.

43. The apparatus of claim 40, further comprising a mechanism within the client system for receiving a randomized number from the host system; and wherein the computation unit includes circuitry to compute the first message digest using the randomized number.

44. The apparatus of claim 40, further comprising a mechanism within the client system for retrieving a comparison threshold from the host system, the comparison threshold indicating how closely a biometric sample taken from a user must match the template in order to allow the user to have access to the host system.

45. The apparatus of claim 44, wherein the computation unit is configured to compute the message digest using the comparison threshold.

* * * * *